United States Patent Office 3,743,525
Patented July 3, 1973

3,743,525
HYDRAULIC CEMENTS FROM GLASS POWDERS
Robert J. Farrauto, Painted Post, and William L. Haynes, Corning, N.Y., assignors to Corning Glass Works, Corning, N.Y.
No Drawing. Filed Apr. 15, 1971, Ser. No. 134,410
Int. Cl. C04b 7/00
U.S. Cl. 106—74
8 Claims

ABSTRACT OF THE DISCLOSURE

The present invention relates to the production of hard, strong, easily prepared hydraulic cements from glass powders in the general composition field $R_2O$—$RO$—$SiO_2$, wherein $R_2O$ consists of $Na_2O$ and/or $K_2O$ and RO consists of MgO, CaO, SrO and/or BaO. The addition of the $H_2PO_4^-$ anion to the glass powders greatly improves the compressive strength of the resultant cement and, in frequent instances, shortens the required setting time for the cement.

---

Portland cement, as well as other commercial cements, derive their strength through hydration and hydrolysis of crystalline compounds, commonly silicates and/or aluminates. We have discovered that crystallinity need not be a mandatory condition in hydraulic cements for the development of strength therein but that certain silicate glasses, when powdered, will react with water to form bodies which set and demonstate an increase in compressive strength with time in the absence of crystalline phases.

The possibility of utilizing glass powders as starting ingredients for hydraulic cement is discussed in U.S. Pat.' No. 3,498,802. That patent describes the production of thermoplastic materials and hydraulic cements through the steam treatment of glass powders having compositions in the alkali metal silicate field. Thus, glass powders encompassed within a specific range of alkali metal silicate compositions ($Na_2O$ and/or $K_2O$—$SiO_2$), when treated in a particular manner in a steam atmosphere, can be transformed into material demonstrating thermoplastic behavior which, both alternatively and additionally, when dampened with water, will set like hydraulic cements.

Whereas relatively strong hydraulic cements could be produced utilizing the disclosure of U.S. Pat. No. 3,498,-802, the chemical durability thereof was not significantly better than portland cement and the additional steam treatment step, normally undertaken in an autoclave, rendered the cost thereof unattractive commercially. Nevertheless, the widely-appreciated shortcomings of portland cement in the areas of chemical durability and resistance to temperature changes have continually provided a challenge to discover materials exhibiting superior characteristics and which could be marketed at a competitive price.

Portland and non-portland cements are commonly a blend of a large number of substances, many of which are crystalline. Silicate glasses obviously contain no crystals but do include silica in varying degrees of polymerization. It is the extent and control of the polymerized network which can be exploited to produce strong, cementitious materials. This control can be achieved by varying the batch composition of the glass, altering the water-to-glass powder ratio in the hydraulic reactions, and by modifying the cured method employed.

We have determined that glass powders passing through a 140 mesh screen, i.e., having diameters less than about 105 microns, and having compositions within sharply delineated areas of the general composition field $R_2O$—$RO$—$SiO_2$, wherein $R_2O$ consists of $Na_2O$ and/or $K_2O$ and RO consists of at least one alkaline earth oxide, will react with water and set up to a strong, useful cement. Thus, glass powders operable in the present invention will consist essentially, in weight percent on the oxide basis, of about 5–40% $R_2O$, wherein $R_2O$ consists of $Na_2O$ and/or $K_2O$, 20–80% $SiO_2$, and 5–70% RO, wherein RO consists of 0–50% CaO, 0–30% MgO, 0–70% SrO, and 0–35% BaO.

Table I records compositions, expressed in weight percent on the oxide basis, of glasses having the potential for forming the hydraulic cements of the instant invention. The ingredients comprising the glass-forming batches may be any materials, either oxides or other compounds, which, on being melted together, are converted to the desired oxide compositions in the proper proportions. The batch ingredients were ballmilled together for about two hours to insure a homogeneous blend and then melted for four-to-five hours in covered platinum crucibles in an electric furnace operating at 1500°–1700° C. The melt was poured through steel rollers to form thin ribbon (2" x 0.002" thick) which was thereafter cooled in air to room temperature. This cold rolling of the melt cooled it sufficiently rapidly to preclude devitrification thereof. However, experience has demonstrated that the presence of minor devitrification in the glass, while definitely unwanted, can be tolerated and does not seriously impair the properties of the final cement with respect to the set time and compressive strength thereof. The manner whereby the glass ribbon is cooled to room temperature appears to have little effect upon the subsequent reactivity with water although annealed glass seemed to have a slightly longer set time.

The glass ribbon was then crushed and ballmilled for about 16–20 hours and the powder collected therefrom passing through a 200 mesh screen (<74 microns). These glass powders were mixed with water in water-to-powder ratios ranging between about 0.25–0.50. The resultant slurries were run into NALGENE® test tubes, the tubes closed with rubber stoppers, and the mixture allowed to react for various lengths of time at room temperature or slightly elevated temperatures, viz, less than about 100° C. where boiling of the water would occur. Because of the presence of water, reaction temperatures above freezing are obviously desirable.

The compressive strength of the hardened cements was discovered to normally increase with the time allowed for reaction to proceed; the time required varying with the particle size of the glass powder, the water-to-powder ratio utilized, and the reaction temperature employed as well as the glass composition. In general, the finer the particle size of the powder the greater the reactivity thereof. Furthermore, smaller water-to-powder ratios and higher curing temperatures will commonly increase the rate of reactivity as well as the compressive strength of the final product. Although some further improvement in strength was observed in some instances where curing times as long as 60 days were employed, the advantage gained through such long time curing was not of sufficient moment as to be economically practical. Therefore, set times of 30 days and less have been deemed desirable.

Table I reports glass compositions, expressed in weight percent on an oxide basis, which exhibit good reactivity with water at temperatures between the freezing point and boiling point thereof and which will produce a body demonstrating substantial compressive strength after a set time of seven days.

TABLE I

|  | 1 | 2 | 3 | 4 | 5 | 6 | 7 | 8 | 9 | 10 | 11 | 12 |
|---|---|---|---|---|---|---|---|---|---|---|---|---|
| $SiO_2$, percent | 42 | 53 | 67 | 63 | 53 | 42 | 40 | 70 | 65 | 20 | 31 | 40 |
| $Na_2O$, percent | 25 | 5 | 20 |  |  |  |  | 20 | 5 | 10 | 30 | 10 |
| CaO, percent | 33 | 42 | 13 | 12 | 42 | 33 | 50 | 0 |  |  |  |  |
| $K_2O$, percent |  |  |  | 25 | 5 | 25 | 10 |  |  |  |  |  |
| MgO, percent |  |  |  |  |  |  |  |  | 10 | 30 |  |  |
| SrO, percent |  |  |  |  |  |  |  |  |  |  | 70 | 39 | 50 |
| BaO, percent |  |  |  |  |  |  |  |  |  |  |  |  |

|  | 13 | 14 | 15 | 16 | 17 | 18 | 19 | 20 | 21 | 22 | 23 | 24 |
|---|---|---|---|---|---|---|---|---|---|---|---|---|
| $SiO_2$, percent | 35 | 45 | 60 | 70 | 70 | 60 | 49 | 25 | 65 | 45 | 40 | 85 |
| $Na_2O$, percent |  |  |  |  | 20 | 10 | 30 |  |  |  |  | 10 |
| CaO, percent |  |  |  |  |  |  |  |  |  |  |  |  |
| $K_2O$, percent | 10 | 30 | 25 | 25 |  |  |  | 30 | 30 | 35 | 25 |  |
| MgO, percent |  |  |  |  |  |  |  |  |  |  |  |  |
| SrO, percent | 55 | 45 |  |  |  |  |  |  | 45 | 5 |  |  |
| BaO, percent |  |  | 15 | 5 | 10 | 30 | 21 |  |  | 20 | 35 | 5 |

Table II recites the curing times and temperatures utilized with the glass powders of Table I as well as compressive strength measurements conducted on samples thereof employing conventional techniques therefor. As in the case with portland cement, various fillers such as sand, gravel, dirt, fly ash, etc., can be blended with the glass powders prior to the reaction with water. In certain instances these additions will increase the water. In certain instances these additions will increase the compressive strength thereof. Generally, additions of up to about 30% can have this effect but beyond that the reactivity is deleteriously impaired and the strength decreases. Several examples of such combinations are also recorded in Table II. The compressive strength of portland cement after a 30-day cure at room temperature is stated to average about 12,000 p.s.i.

TABLE II

| Example No. | Curing treatment | Compressive strength, p.s.i. |
|---|---|---|
| 1 | 25° C. for 7 days | 1,000 |
| 2 | do | 1,600 |
| 2 | do | 4,000 |
| 3 | do | 2,500 |
| 4 | do | 2,500 |
| 5 | do | 2,500 |
| 6 | do | 1,000 |
| 7 | do | 3,000 |
| 8 | do | 4,000 |
| 9 | do | 500 |
| 10 | do | 4,000 |
| 11 | do | 2,000 |
| 12 | do | 4,000 |
| 13 | do | 3,000 |
| 14 | do | 10,000 |
| 15 | do | 3,000 |
| 16 | do | 6,000 |
| 17 | 25° C. for 3 days plus 50° C. for 4 days | 18,000 |
| 18 | 70° C. for 7 days | 2,000 |
| 19 | do | 2,000 |
| 20 | do | 2,000 |
| 21 | do | 1,000 |
| 22 | do | 1,000 |
| 23 | do | 1,000 |
| 24 | do | 3,000 |
| 1 [1] | do | 1,500 |
| 1 [2] | do | 800 |

[1] Plus 25% sand.
[2] Plus 50% sand.

Differential thermal analyses of the instant cements have demonstrated the presence of two water peaks, one at about 150° C. and a second between 400°–500° C. Laboratory studies have indicated that about 90% of the absorbed water can be expelled from the cured bodies when such are exposed to temperatures between about 150°–200° C. This practice improves the chemical durability of the cements to a substantial degree. In general, exposure times of about 8–24 hours have been found sufficient to accomplish this purpose and, whereas long exposure times will, of course, remove more water, the further effect is so small as to be commercially unfeasible.

We have discovered that the addition of $H_2PO_4^-$ anion to the glass powder prior to the preparation of a water slurry therefrom promotes a significant increase in the ultimate strength. Hence, additions of about 5–15% by weight of $NaH_2PO_4$ and/or $KH_2PO_4$ have been observed to increase the reactivity of the glass powder by a factor of as high as five and the ultimate strength by a factor of in some cases of four. This effect appears to be unique to additions of the $H_2PO_4^-$ anion inasmuch as other phosphate additions appear to have no substantial effect on reactivity.

Table III recites several examples of glass compositions set out in Table I which were combined with $KH_2PO_4$. In each instance, four grams of $KH_2PO_4$ were blended with 50 grams of the respectivem glass powder and this mixture then combined with water in water-to-powder ratios varying between about 0.25–0.50. The curing time and temperature utilized for each product are recorded along with a measurement of the compressive strength obtained.

TABLE III

| Example No. | Curing treatment | Compressive strength, p.s.i. |
|---|---|---|
| 1 | 25° C. for 7 days | 6,000 |
| 6 | 70° C. for 7 days | 2,500 |
| 17 | 25° C. for 4 days plus 50° C. for 6 days | 22,500 |
| 22 | 70° C. for 7 days | 5,500 |

U.S. application Ser. No. 134,409, filed concurrently herewith in the names of Robert J. Farrauto and William L. Haynes, discloses the production of hydraulic cements from glass powders essentially free from alkaline earth metal oxides in the general composition field $$R_2O-SiO_2-P_2O_5$$

wherein $R_2O$ consists of $Na_2O$ and/or $K_2O$, which are relatively very fast setting. Those cements are not as chemically durable as the cements of the present invention but have the advantage of extremely fast setting, i.e., many compositions will set within a few minutes.

The mechanism of the reactions involved between water and the $R_2O-RO-SiO_2$ glasses of the present invention is not completely understood but the following explanation is believed to be valid. It has been observed that the rate of development of initial strength in the body is directly proportional to the alkali content ($R_2O$) of the powder, but the ultimate strength of the product is higher for compositions having low alkali contents. Inasmuch as the rate of dissolution of an alkali silicate glass in water is directly proportional to the alkali content thereof, it is believed reasonable to assume that the initial reaction or set rate is controlled by the rate of dissolution of the glass. Since the ultimate strength of the cement is also affected by the alkali content, it is believed that the inverse relationship obtaining between ultimate strength and alkali content is due to increased linkage between the dissolved silica species, i.e., a polymerization process.

Undoubtedly the alkaline earth oxide (RO) exerts a further effect upon reactivity since it can also break down bonding between the silica tetrahedra in the glass, both before and after reaction with water. Thus, the more soluble alkaline earth oxides, viz., SrO and BaO, can themselves generate an alkaline environment upon hydrolysis thereby facilitating the dissolution of the glass which is demanded for the development of strength in the product. The glasses containing the less soluble alkaline earth oxides, viz., MgO and CaO, tend to be less reactive and the final product is normally consequently weaker.

As the direct result of this inverse relationship existing between reactivity and ultimate strength on the one hand and the presence of alkali metal oxides and alkaline earth metal oxides on the other, our preferred compositions consist essentially, by weight on the oxide basis, of about 40–70% $SiO_2$, 10–30% $R_2O$, wherein $R_2O$ consists of $Na_2O$ and/or $K_2O$, and 10–50% RO, wherein RO consists of 0–50% CaO, 0–30% MgO, 0–50% SrO, and/or 0–35% BaO.

The present invention is of particular significance with glasses in the $Na_2O$—CaO—$SiO_2$ composition system inasmuch as ordinary glass bottles and window panes are made therefrom. This factor has prominent ecological overtones since such articles, particularly the non-returnable bottle, can provide a source of raw batch material. Hence, a second use for such "waste" material is plainly established. In a typical illustration of this practice, a group of non-returnable bottles was crushed and ball-milled and additional $CaCO_3$ was added to bring the composition to 10% $Na_2O$, 40% CaO, and 50% $SiO_2$. The mixture was melted at 1650° C. for four hours and cold rolled into glass ribbon. This glass ribbon was ballmilled for 20 hours and passed onto a 200 mesh screen. The powder passing through the screen was blended with water in a water-to-powder ratio of about 0.35. The slurry was run into NALGENE® test tubes, covered, and cured for 30 days at room temperature. A white cement resulted therefrom exhibiting a compressive strength of 3000 p.s.i. after curing at 70° C. for 7 days.

We have found the maximum particle size of the glass powder to be extremely critical to the operability of the invention. Thus, reactivity is greater the smaller the particle size and, where particles much greater than those passing a 140 mesh sieve are utilized, the reaction becomes too slow to be practical. Such particles could, of course, be used as fillers but are too inactive to promote a rapid reaction with water. Because of this factor, powders having diameters passing a 200 mesh screen are much to be preferred.

Finally, whereas the greatest reactivity and highest ultimate compressive strength are secured where the glass powders consist essentially exclusively of the above-recited $R_2O$—RO—$SiO_2$ constituents with, optionally, the $H_2PO_4^-$ anion, we have learned that various impurities not exceeding about 5% by weight individually and no more than about 10% by weight in toto can be tolerated. Such impurities may include CdO, ZnO, PbO, and $B_2O_3$.

We claim:
1. A hydraulic cement composed of glass powders consisting essentially, in weight percent on the oxide basis, of about 5–40% $R_2O$, wherein $R_2O$ consists of $Na_2O$ and/or $K_2O$, 5–70% RO, wherein RO consists of 0–50% CaO, 0–30% MgO, 0–70% SrO, and 0–35% BaO, 5–15% $NaH_2PO_4$ and/or $KH_2PO_4$, and 20–80% $SiO_2$.
2. A hydraulic cement according to claim 1 wherein said glass powders consist essentially, by weight on the oxide basis, of about 10–30% $R_2O$, wherein $R_2O$ consists of $Na_2O$ and/or $K_2O$, 10–50% RO, wherein RO consists of 0–50% CaO, 0–30% MgO, 0–50% SrO, and 0–35% BaO, 5–15% $NaH_2PO_4$ and/or $KH_2PO_4$, and 40–70% $SiO_2$.
3. A method for making a body of hydraulic cement which comprises:
  (a) melting a batch for a glass consisting essentially, in weight percent on the oxide basis, of about 5–40% $R_2O$, wherein $R_2O$ consists of $Na_2O$ and/or $K_2O$, 5–70% RO, wherein RO consists of 0–50% CaO, 0–30% MgO, 0–70% SrO, and 0–35% BaO, and 20–80% $SiO_2$;
  (b) cooling said melt to a glass body;
  (c) reducing said glass body to a powder passing through a 140 mesh screen;
  (d) admixing water to said glass powder at temperatures between the freezing and boiling points of the water in water-to-powder ratios ranging between about 0.25–0.50; and
  (e) maintaining said mixture within said temperature range for a period of time sufficient to cure same to a solid body.
4. A method for making a body of hydraulic cement according to claim 3 wherein 5–15% by weight total of $NaH_2PO_4$ and/or $KH_2PO_4$ is added to said glass powder prior to the water being admixed therewith.
5. A method for making a body of hydraulic cement according to claim 3 wherein said batch consists essentially, by weight on the oxide basis, of about 10–30% $R_2O$, wherein $R_2O$ consists of $Na_2O$ and/or $K_2O$, 10–50% RO, wherein RO consists of 0–50% CaO, 0–30% MgO, 0–50% Sr and 0–35% BaO, and 40–70% $SiO_2$.
6. A method for making a body of hydraulic cement according to claim 3 wherein said glass body is reduced to a powder passing through a 200 mesh screen.
7. A method for making a body of hydraulic cement according to claim 3 wherein said solid body is heated to a temperature between about 150°–200° C. for a period of time sufficient to expel absorbed water.
8. A method for making a body of hydraulic cement according to claim 7 wherein said time sufficient to expel absorbed water ranges between about 8–24 hours.

References Cited
UNITED STATES PATENTS

| | | | |
|---|---|---|---|
| 2,886,404 | 5/1959 | Teja | 106—74 |
| 2,964,415 | 12/1960 | Payne et al. | 106—74 |
| 3,069,277 | 12/1962 | Teja | 106—74 |
| 3,498,802 | 3/1970 | Bickford et al. | 106—74 |
| 3,071,480 | 1/1963 | Searight et al. | 106—52 |
| 3,365,315 | 1/1968 | Beck et al. | 106—52 |

JAMES E. POER, Primary Examiner

U.S. Cl. X.R.

106—85

UNITED STATES PATENT OFFICE
CERTIFICATE OF CORRECTION

Patent No. 3,743,525　　　　　　　　Dated July 3, 1973

Inventor(s) Robert J. Farrauto and William L. Haynes

It is certified that error appears in the above-identified patent and that said Letters Patent are hereby corrected as shown below:

Column 3, lines 28-29, delete "In certain instances these additions will increase the water.".

Column 3, Table II, Example No. 2 (second occurrence), Heading "Curing Treatment", change "25°C. for 7 days" to -- 70°C. for 7 days --.

Column 3, Table II, Example No. 1 [1], heading "curing treatment", change "70°C. for 7 days" to -- 25°C. for 7 days --.

Column 4, line 6, before "ultimate" insert -- reactivity thereof with a consequent improvement in --.

Column 4, line 17, change "respectivem" to -- respective --.

Signed and sealed this 18th day of December 1973.

(SEAL)
Attest:

EDWARD M. FLETCHER, JR.　　　　RENE D. TEGTMEYER
Attesting Officer　　　　　　　Acting Commissioner of Patents